(12) United States Patent
Chang et al.

(10) Patent No.: US 10,015,271 B1
(45) Date of Patent: Jul. 3, 2018

(54) GLOBAL SHARING AND ACCESS TO ELECTRONIC RESOURCES

(75) Inventors: Peter C. Chang, Union City, CA (US); Anthony Magliulo, Fremont, CA (US)

(73) Assignee: OXYGEN CLOUD, INC., Redwood City, CA (US)

(*) Notice: Subject to any disclaimer, the term of this patent is extended or adjusted under 35 U.S.C. 154(b) by 1534 days.

(21) Appl. No.: 13/284,476

(22) Filed: Oct. 28, 2011

(51) Int. Cl.
- *H04L 29/06* (2006.01)
- *H04L 29/08* (2006.01)
- *G06F 17/30* (2006.01)
- *H04L 12/58* (2006.01)

(52) U.S. Cl.
CPC .... *H04L 67/2823* (2013.01); *G06F 17/30867* (2013.01); *G06F 17/30905* (2013.01); *H04L 51/066* (2013.01); *H04L 65/601* (2013.01); *H04L 69/08* (2013.01)

(58) Field of Classification Search
CPC ..... H04W 4/021; H04W 12/06; H04W 40/20; H04W 4/04; H04W 72/02; H04L 41/0823; H04L 67/303; H04L 63/0876; H04L 9/0866; H04L 65/1059; H04L 67/2847; H04L 67/2852; G05B 15/02; H04M 15/771
See application file for complete search history.

(56) References Cited

U.S. PATENT DOCUMENTS

| | | | | |
|---|---|---|---|---|
| 8,487,772 | B1* | 7/2013 | Higgins | 340/573.1 |
| 2003/0002073 | A1* | 1/2003 | Berkema | G06F 3/1205 358/1.15 |
| 2004/0205561 | A1* | 10/2004 | Gibbs | G06F 17/211 715/235 |
| 2004/0249602 | A1* | 12/2004 | Gomez | G06Q 10/04 702/181 |
| 2005/0111378 | A1* | 5/2005 | Chen | H04L 43/00 370/252 |
| 2006/0212621 | A1* | 9/2006 | Ash | H04N 7/163 710/62 |
| 2007/0136244 | A1* | 6/2007 | MacLaurin et al. | 707/3 |
| 2008/0244038 | A1* | 10/2008 | Martinez | 709/218 |
| 2008/0263086 | A1* | 10/2008 | Klemba et al. | 707/103 R |
| 2009/0047993 | A1* | 2/2009 | Vasa | G11B 27/105 455/556.1 |
| 2009/0185074 | A1* | 7/2009 | Streijl | H04N 7/0885 348/468 |
| 2010/0005138 | A1* | 1/2010 | Manzano | 709/203 |
| 2011/0173304 | A1* | 7/2011 | Schlack | H04L 65/4084 709/220 |
| 2011/0197032 | A1* | 8/2011 | Patey | 711/133 |
| 2012/0297306 | A1* | 11/2012 | Hassan et al. | 715/735 |

* cited by examiner

*Primary Examiner* — Aaron Strange
(74) *Attorney, Agent, or Firm* — Kilpatrick Townsend & Stockton LLP

(57) ABSTRACT

A method of managing data objects at a remote computing system is disclosed. The method includes receiving a request to provide a recipient associated with a recipient computing device with access to a data object, providing an identifier that references the data object, receiving a request for the data object from the recipient, and providing the recipient with access to the data object based on one or more characteristics of the recipient computing device.

15 Claims, 13 Drawing Sheets

GLOBAL SHARING AND ACCESS TO ELECTRONIC RESOURCES

BACKGROUND

Embodiments of the present invention relate to the global sharing of and access to electronic resources, and in particular to sharing and accessing resources using a remote computing system.

Various techniques for sharing data between users are in use today. For example, users may copy data to a portable storage device (such as CD's, DVD's, USB keys, and the like) and provide the portable storage device to a recipient. The recipient may then copy the data from the portable storage device to a computing device associated with the recipient, and subsequently consume or attempt to consume the data.

Various techniques for sharing data using remote computing systems are also in use today. For example, Dropbox™ by Dropbox, Inc. of San Francisco, Calif. provides cloud storage by which users can copy data between computers having the Dropbox™ software installed and share data with others. To do so, a networked folder is provided on the user's computer, and any data that the user moves to that networked folder can be synchronized with remote servers. The user may then access the data on the remote servers from another device having the Dropbox™ software installed or share the data on the remote servers with others by sending a link to a website where the other individuals may download the data.

While the more recent provisions for sharing data between users via remote computing systems provide enhancements over traditional file sharing such as copying data to portable storage devices (such as CD's, DVD's, USB keys, and the like), all of these known techniques suffer from numerous deficiencies. For example, none of the techniques take into consideration the environment or context (e.g., the software and/or hardware configuration) of the recipient's computing device. As a result, when a user attempts to share data with the recipient, they have no way of knowing whether or not the recipient will be able to successfully consume that data. On the recipient's side, if the recipient is not able to consume the data as originally communicated from the sender, the recipient is then forced to pursue undesirable alternatives, such as installing different software, requesting the sender to convert the data, etc.

BRIEF SUMMARY

Embodiments of the present invention overcome some or all of the aforementioned deficiencies in the related art and provide one or more additional advantages as discussed herein. In one embodiment, a method of operating a user computing device is disclosed. The method includes receiving a user request from a user of a user computing device to share a data object with a recipient associated with a recipient computing device. The method also includes determining whether or not information about one or more characteristics of a recipient computing device associated with the recipient is available, and generating an identifier that references the data object, wherein the identifier is generated based on whether or not information about one or more characteristics of a recipient computing device associated with the recipient is available. In some cases, the identifier may be generated using at least one of the one or more characteristics of the recipient computing device.

In another embodiment, a method of operating a recipient computing device is disclosed. The method includes receiving a request from a recipient associated with a recipient computing device to access a data object stored at a device other than the recipient computing device. The method also includes determining whether the recipient computing device is operable to consume the data object in accordance with a first consumption process. If it is determined that the recipient computing device is not operable to consume the data object in accordance with the first consumption process, then information indicating that the recipient computing device is inoperable to consume the data object in accordance with the first consumption process may be communicated to the device at which the data object is stored.

In yet another embodiment, a method of managing data objects at a remote computing system is disclosed. The method includes receiving a request to provide a recipient associated with a recipient computing device with access to a data object, providing an identifier that references the data object, receiving a request for the data object from the recipient, and providing the recipient with access to the data object based on one or more characteristics of the recipient computing device.

For a more complete understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

DETAILED DESCRIPTION

Figure 1:
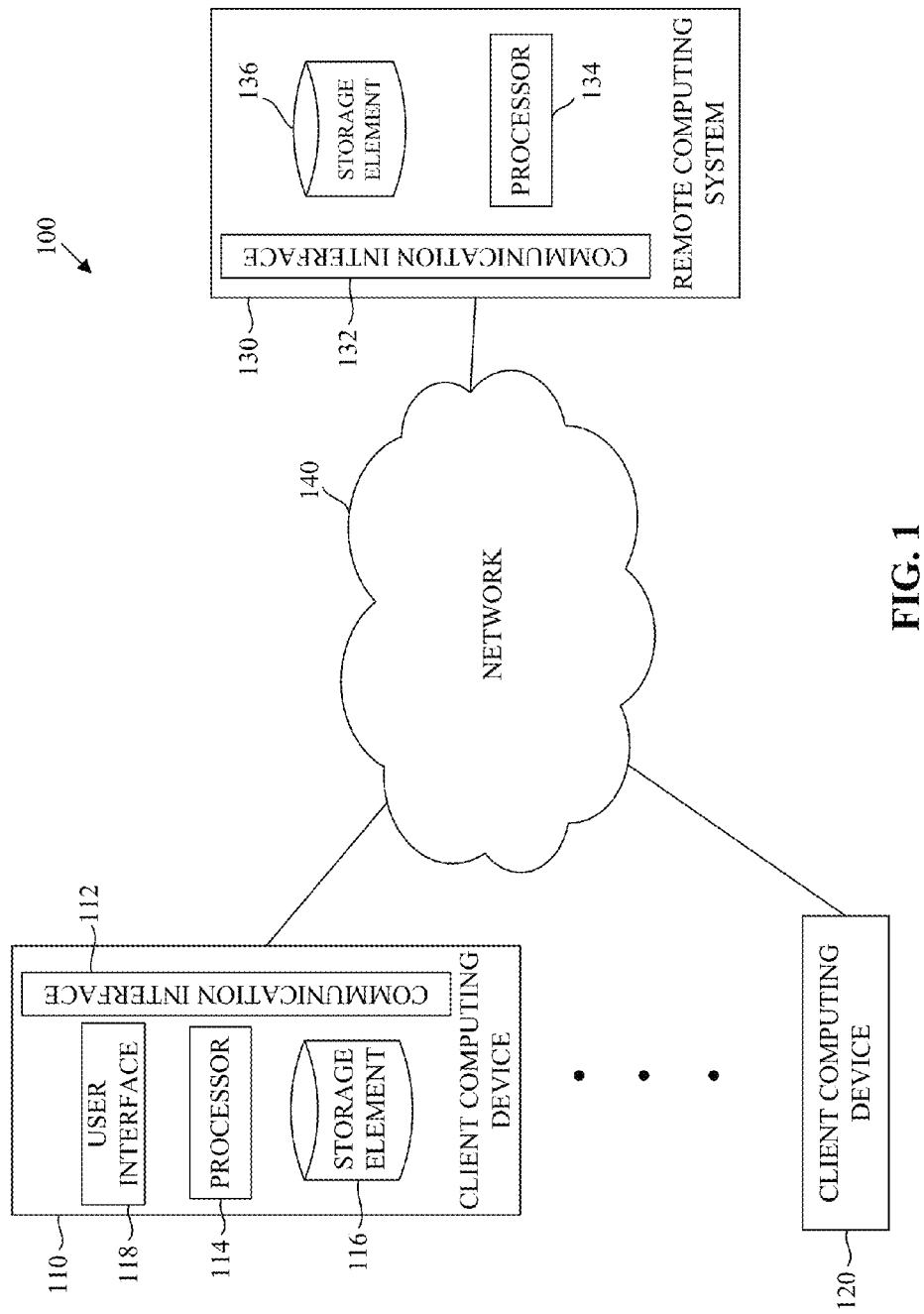
FIG. 1 is a simplified system illustrating an environment operable to implement aspects of one or more of the embodiments disclosed herein.

Embodiments of the present invention generally relate to allowing users of computing devices to share resources with other users of computing devices (recipients) regardless of where the user and recipient are located, regardless of where the shared resources are located, regardless of the hardware and/or software configuration of a user's computing device, or otherwise regardless of the computing environment in which the recipient attempts to access the resources. In providing such resource sharing, a user wishing to share resources with others may advantageously share those resources without concern for whether the recipient's computing device is operable to consume the shared resources. For example, a user desiring to share a Microsoft Word™ document with one or more recipients may do so without a concern as to whether the recipient is associated with a computing device having software and/or hardware operable to open or otherwise view the Microsoft Word™ document.

This may be achieved, in some embodiments, by acquiring information concerning the computing environment and/or computing context in which the recipient is attempting to access a resource, and using such information to customize a method for the recipient to consume the shared resource, where the shared resource may be provided at the sender's computing device and/or another device other than the recipient's computing device (such as a computing system that is remote from both the sender's computing device and the recipient's computing device).

The information concerning the computing environment and/or computing context in which the recipient is attempting to access a resource may be used in one or more of a variety of fashions. In one embodiment, at a sender's computing device, the sender may acquire such information about the recipient computing device and subsequently use such information to customize an identifier that references a shared data object. While the shared data object may be provided on any device other than the recipient computing device, for ease of explanation the shared data object may be discussed as being provided on a remote computing system. Upon receiving the identifier, the recipient may then access and consume the data object in accordance with the customized identifier. For example, the sender may acquire information indicating that the recipient computing device is operable to execute an application for synchronizing with the remote computing system. The sender's computing device may then generate the identifier such that, upon execution, the recipient's computing device synchronizes the data object stored on the remote computing system.

In another embodiment, the sender may not acquire such information about the recipient computing device, but rather may generate a general identifier that references the shared data object and is not generated based on information about the recipient's computing device. In this case, the identifier may reference the data object and provide for a preferred (i.e., preferred by the sender) consumption process, even though it is not known to the sender whether or not the recipient computing device may be able to consume the data object using the preferred consumption process. For example, the sender may generate an identifier such that, upon execution, if the recipient's computing is operable to execute an application that synchronizes with the remote computing system, the recipient's computing device will execute such an application to consume the data object. However, if the recipient's computing device is not operable to execute the application, the recipient's computing device may attempt to consume the data object in accordance with another, different process. In some cases, the other process may be a default process, where the default process is one which a significant number of computing devices are operable to perform. For example, the preferred consumption process may be for the recipient computing device to execute a particular application for synchronizing with the remote server, whereas the default consumption process may be for the recipient computing device to download a copy of the data object from a website via an arbitrary web browser. For another example, the preferred consumption process may be for the recipient computing device to execute a particular word processor such as Microsoft Word™, whereas the default consumption process may be for the recipient computing device to execute a more general processor such as a text editor. In this case, if the data object were provided by the sender in Microsoft Word™ format, the remote computing system may operate to convert the data object to the more standard ASCII text format, and provide the ASCII text version for consumption by the recipient computing device.

In another embodiment, the remote computing system may acquire information about the recipient computing device and use such information to provide the recipient with access to the data object. In one case, the remote computing system may use the information about the recipient computing device to generate a custom identifier (similar to that discussed above) and provide the custom identifier to the sender's computing device upon request. For example, a sender may provide, to the remote computing system, a data object to be shared. The sender my then indicate a desire to share the data object with a particular recipient. The remote computing system, upon receiving such an indication, may acquire information about the recipient computing device (such as what kind of hardware capabilities the recipient computing device comprises and/or what kind of software components the recipient computing device may be operable to execute) and use that information to generate an identifier that is not only unique to the recipient but also references the data object to be shared. The remote computing device may then provide the customized identifier to the user computing device such that the user computing device may subsequently communicate the identifier to the recipient, or the remote computing device itself may communicate the identifier to the recipient.

In another case, the remote computing device may use the information about the recipient computing device to otherwise provide the recipient with the data object. For example, the sender may not have any information concerning the recipient computing device, or may have incorrect or obsolete information concerning the recipient computing device. The sender may then communicate a general identifier or an inaccurate customized identifier to the recipient. Upon executing the identifier, the recipient computing device may then attempt to consume the data object in accordance with the preferred consumption process defined by the identifier and/or data object. In attempting to consume the data object, the recipient computing device may establish communications with the remote computing system. As part of the communications, the recipient computing device may provide information indicating that it is incapable of consuming the data object in accordance with the preferred consumption process. In response, the remote computing system may provide an alternative process by which the data object may be consumed. The alternative process may be any suitable alternative process. For example, it may be a default process such as that previously discussed. In providing the alternative process, the remote computing system may use previously acquired information concerning the remote computing system or, in some cases, may acquire new information concerning the remote computing system. Such information may then be used by the remote computing system to provide the alternative process so as to increase the likelihood that the recipient computing device may be able to consume the data object.

For example, the sender may communicate a general identifier to a recipient, where the general identifier references a data object stored by a remote computing system and indicates a preferred consumption process in which a particular application is to be executed by the recipient computing device so as to synchronize the recipient computing device with the remote computing system. The recipient computing device may not have the particular application installed or otherwise executing, and subsequently provide information to the remote computing system that it is inoperable to synchronize with the remote computing system. In response, the remote computing system may provide a default consumption process such as a web page hosting the data object, by which the recipient computing device may download the data object, view the contents of the data object via the web page, or otherwise consume the data object.

For another example, the sender may communicate a general identifier to a recipient, where the general identifier references a data object stored by a remote computing system and indicates a preferred consumption process in which a particular application, such as a particular word processing application, is necessary for consuming the data object. The recipient computing device may not have the particular application installed or otherwise executing, and subsequently provide information to the remote computing system that it is inoperable to execute an application necessary to consume the data object in its current form. In response, the remote computing system may provide a default consumption process such as a copy of the data object converted into a standard text format, or in another format which may be identified based on information indicating the software and/or hardware capabilities of the recipient computing device.

In one particular example concerning synchronization, a sending computing device may execute an application that creates a networked folder (e.g., an O:\ drive). Data objects such as image or video files that are placed in the networked folder may then subsequently be synchronized with a remote server. The user may choose to share the data objects with other individuals by selecting one or more of the data objects provided in the networked folder. In so doing, an identifier that references the corresponding data object provided on the remote server and indicates a preferred consumption process is created which the user or remote server may subsequently communicate to one or more recipients. By engaging the identifier, the recipient(s) may then access the data object(s) provided on the remote server.

At the recipient side, the recipient may engage the identifier to access the data object(s) in a number of ways. In some embodiments, how the recipient engages the identifier and accesses the data objects depends on whether the computing device the recipient uses to engage the reference is operable to consume the data object in accordance with the preferred consumption process. For example, if the recipient has the application used by the sender of the data object installed or executing, then the recipient may similarly have a networked folder created by the application. In this case, the referenced data object may be consumed by synchronizing the data object with the recipient computing device. By providing such a dual synchronization, an unprecedented ability to collaborate and share data amongst different users is provided, whereby changes to the data object by the recipient may be communicated to the sender, and similarly, changes to the data object by the sender may be communicated to the recipient. On the other hand, if the recipient does not have the application installed or executing, the recipient may still consume the data object in accordance with a second (e.g., default) consumption process, such as by acquiring a copy of the data object via, for example, a web interface.

Referring now to the drawings, in which like reference numerals represent like parts throughout the several views, FIG. 1 provides a simplified system 100 illustrating an environment operable to implement aspects of one or more of the embodiments disclosed herein. System 100 includes one or more client computing devices 110-120 and a remote computing system 130 all interconnected via a network 140.

Client computing devices 110-120 may include any suitable electronic computing devices, such as a mobile phone, a personal digital assistant (PDA), a handheld or portable device (iPhone™, Blackberry™, etc.), a notebook, personal computer, note pad or other electronic device configured for wired or wireless communication. At least some of client computing devices 110-120 may be associated with end users having a desire to share data with others or, as a recipient of shared data, access or otherwise consume that data.

Client computing devices 110-120 may include any suitable components typically found in such electronic device necessary to perform the operations discussed herein. In one embodiment and as illustrated in FIG. 1, a client computing device 110 includes a communication interface 112, a processor 114, a tangible non-transitory computer readable storage element 116, and a user interface 118. Communication interface 112 is any suitable interface or interfaces operable to enable communication between client computing device 110 and other elements of system 100, such as remote computing system 130. Processor 114 is any suitable computing processor or processors operable to execute instructions that cause client computing device 110 to perform one or more of the operations discussed herein. For example, processor 114 may execute software code stored in one or more storage elements such as storage element 116. Storage element 116 may be any storage element or storage elements suitable for storing data, software code, and other information used by client computing device 110. For example, storage element 116 may include one or more of random access memory (RAM), read only memory (ROM), electrically-erasable programmable read only memory (EEPROM), a hard disk, an optical disk, etc. User interface 118 may include one or more elements for receiving input from a user and providing outputs to the user. For example, user interface 118 may include a keypad, a display, a touch screen, or a combination thereof.

Remote computing system 130 may be any suitable electronic computing device or system of electronic computing devices operable to store and disseminate data files including data objects and metadata and, in some cases, references to these data files. In some embodiments, remote computing system 130 may be a plurality of networked computing devices whereby portions of the data files are stored on one or more of the computing devices. For simplicity, remote computing system 130 is shown and discussed as a single computing device, although a person of ordinary skill in the art would recognize that remote computing system 130 may be implemented as a plurality of devices and/or storage elements.

Remote computing system 130 may include any suitable components typically found in such systems necessary to perform the operations discussed herein. In one embodiment and as illustrated in FIG. 1, remote computing system 130 includes a communication interface 132, a processor 134, and a tangible non-transitory computer readable storage element 136. Communication interface 132 is any suitable interface or interfaces operable to enable communication between remote computing system 130 and other elements of system 100, such as one or more of client computing devices 110-120. Processor 134 is any suitable computing processor or processors operable to execute instructions that cause remote computing system 130 to perform one or more of the operations discussed herein. For example, processor 134 may execute software code stored in one or more storage elements such as storage element 136. Storage element 136 may be any storage element or storage elements suitable for storing data, software code, and other information used by remote computing system 130. For example, storage element 136 may include one or more of random access memory (RAM), read only memory (ROM), electrically-erasable programmable read only memory (EEPROM), a hard disk, an optical disk, etc.

Network 140 is any suitable network for enabling communications between various entities, such as between client computing devices 110-120 and remote computing system 130. Such a network may include, for example, a local area network, a wide-area network, a virtual private network, the Internet, an intranet, an extranet, a public switched telephone network, an infrared network, a wireless network, a wireless data network, a cellular network, or any other such network or combination thereof. The network may, furthermore, incorporate any suitable network topology. Examples of suitable network topologies include, but are not limited to, simple point-to-point, star topology, self organizing peer-to-peer topologies, and combinations thereof. Components utilized for such a system may depend at least in part upon the type of network and/or environment selected. Network 140 may utilize any suitable protocol, such as TCP/IP, OSI, FTP, UPnP, NFS, CIFS, and AppleTalk™. Communication over the network may be enabled by wired or wireless connections, and combinations thereof.

System 100 in certain embodiments is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of system 100 in FIG. 1 should be taken as being illustrative in nature, and not limiting to the scope of the disclosure.

Figure 2:
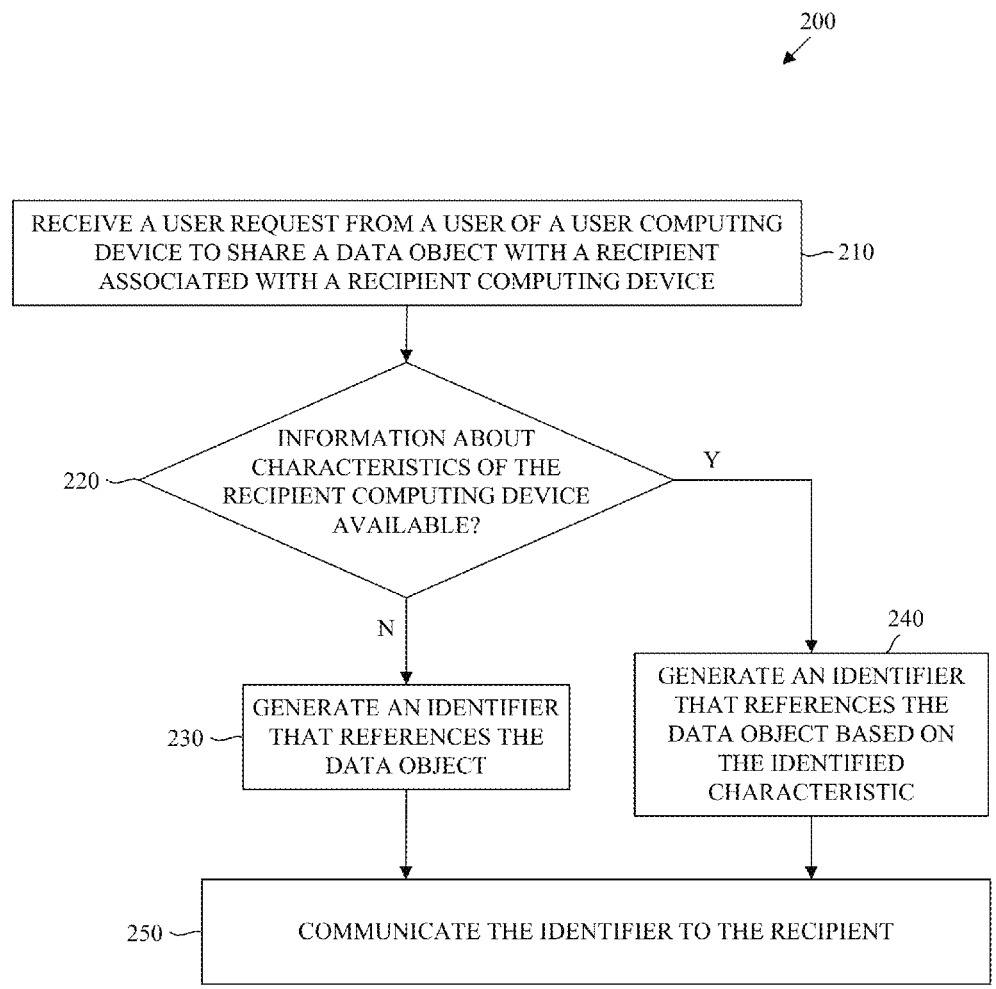
FIG. 2 is a flowchart depicting example operations of a sender client computing device in accordance with an embodiment.

FIG. 2 is a flowchart depicting example operations 200 of a sender computing device 110 in accordance with an embodiment. The example operations show one or more steps that may be used by an individual hosting content to share that content with others.

In operation 210, a user request is received from a user of a user computing device to share a data object with a recipient associated with a recipient computing device. The data object and its associated metadata may be stored at any suitable computing device or system. For example, the metadata may be stored at storage element 116 of client computing device 110 (FIG. 1), and the associated data object may be stored at client computing device 110 or at storage element 136 of remote computing system 130. The data object may be information representing any type of data, such as an image encoded using any suitable image encoding algorithm (e.g., JPEG, TIFF, GIF, etc.), a video encoded using any suitable video encoding algorithm (e.g., MPEG, H.264, VC-2, etc.), a document (e.g., a Word™ document, a WordPerfect™ document, an Excel™ spreadsheet, etc.), or any other data type. The data object is associated with metadata, where the metadata may be any suitable data indicating one or more characteristics of the data object. For example, the metadata may indicate a date and time the data object was created or last modified, a name of a user who created and/or modified the data object, a version of the data object, etc. In some cases, the metadata may be specific to the type of data represented by the data object. For example, the metadata for an image file may indicate image properties such as the number of pixels in the image, the resolution of the image, the type of camera used to acquire the image, etc., whereas metadata for a Word™ document may indicate document properties such as the number of words, lines, and paragraphs in the document.

In some embodiments, the data object and associated metadata may be synchronized with remote computing system 130. In this case, changes to either the data object or its metadata made at client computing device 110 may be propagated to the corresponding data object and associated metadata stored at remote computing system 130, and similarly, changes to either the data object or its metadata made at remote computing system 130 may be propagated to the corresponding data object and associated metadata stored at remote computing system 130.

Figure 6A:
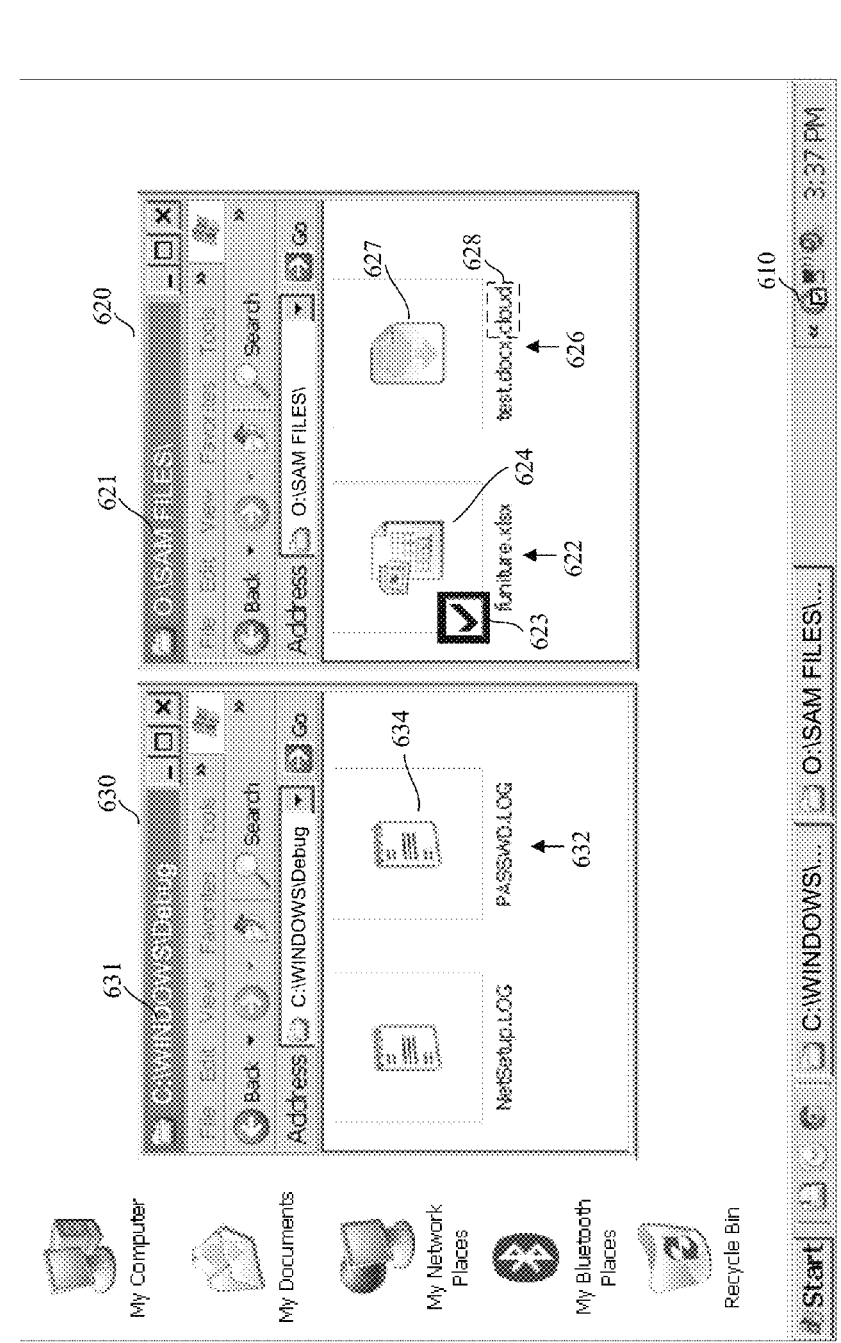
FIG. 6A shows a simplified graphical user interface of a sender's client computing device in which a particular application is executing.

For example, turning briefly to FIG. 6A, FIG. 6A shows a simplified graphical user interface (GUI) 600 of a sender's computing device 110 (FIG. 1) in which a particular application 610 is executing. A network folder 620 is provided (e.g., by being generated by application 610) whereby data objects provided therein may be synchronized with remote computing system 130 (FIG. 1). For example, referring to network folder 620, in this case referred to as "O:\SAM FILES\" 621, information identifying a first data object 622 and a second data object 626 is displayed.

First data object 622 and its associated metadata in this example are synchronized with remote computing system 130, whereby such synchronization is shown using an indicator that may be any suitable indicator for indicating such synchronization. In this case, the indicator includes a checkbox 623 and/or a graphical image 624. Checkbox 623 need not necessarily be a checkbox, but could be any other suitable graphical symbol, such as a circle, diamond, or other graphical element. Graphical image 624 may be representative of the content of first data object 622. For example, if first data object 622 is an image file, the graphical image may be a thumbnail of the image. The thumbnail of the image may be generated using the first data object stored in storage element 116 of client computing device 110. However, graphical image 626 need not be representative of the content of first data object 622, but in some embodiments may be an arbitrary image indicating that the first data object is stored on client computing device 110.

Second data object 626 in this example is not synchronized with remote computing system 130, although the metadata associated with second data object 626 is synchronized with remote computing system 130. Such synchronization is shown using an indicator which may be any suitable indicator for indicating such synchronization. In this case, the indicator includes a graphical image 627 of a cloud. Graphical image 627 may be a default image stored in storage element 116 that is displayed any time second data object 626 is not synchronized. In some embodiments, a file extension 628 may operate as the second indicator. For example, a default file extension such as "cloud" (or any other suitable text or alphanumeric sequence) may be appended to the actual filename. The filename of second data object 626 may be generated from the metadata associated with second data object 626 and stored in storage element 116 of client computing device 110. The default file extension may then be added to the filename and displayed to the user.

Further, a local folder 630 is also provided whereby data objects provided therein may be stored on a local storage element (e.g., storage element 116). For example, referring to local folder 630, in this case referred to as "C:\WINDOWS\Debug" 631, information identifying a third data object 632 is displayed. Third data object 632 and its associated metadata in this example are not synchronized with remote computing system 130. Rather, they are stored only locally on the device, such as in storage element 116 of client computing device 110. The local data object may be illustrated via an indicator such as graphical image 634, which may be an image representative of the content of third data object 632. Accordingly, in one embodiment, metadata may be stored at computing device 110, where the metadata is associated with a data object that is stored at the computing device (e.g., first data object 624 and/or third data object 632) or at a remote computing system (e.g., second data object 626).

Figure 6B:
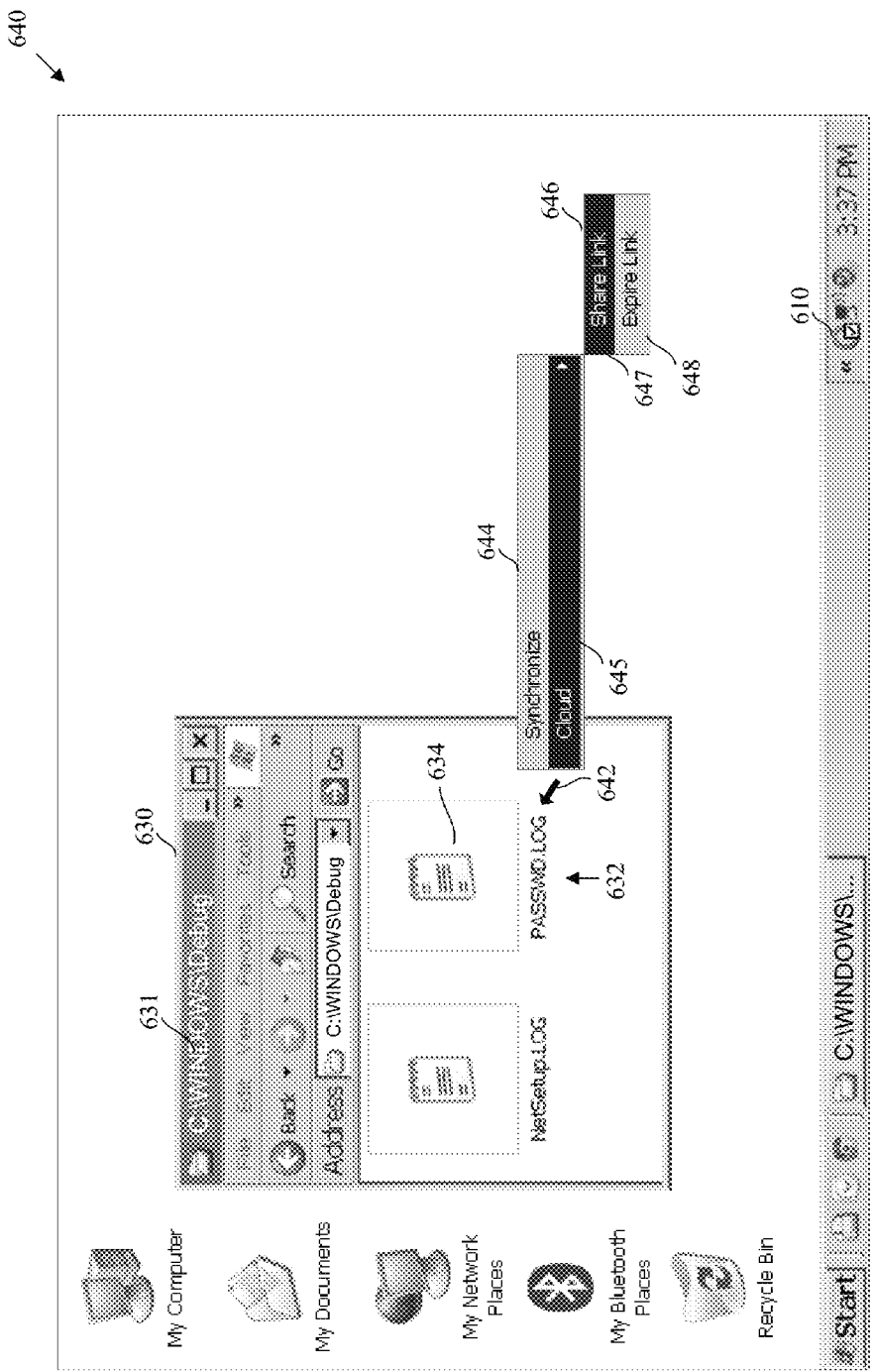
FIG. 6B shows a simplified graphical user interface of a sender's client computing device in which a data object is selected for sharing.

Returning now to FIG. 2, the user request is received from a user of the computing device to share the data object with a recipient. For example, a user of computing device 110 may communicate a user request via user interface 118 to computing device 110 (FIG. 1). Turning briefly to FIG. 6B, FIG. 6B shows a simplified GUI 640 of a sender's computing device 110 in which a data object is selected for sharing. In this embodiment, a user has used pointer 642 to select third data object 632 and is subsequently provided with a first context menu 644 including a cloud option 645 via which the user may select networking activities to conduct with the selected object. In this case, upon selection of cloud option 645, a second context menu 646 is displayed which includes an option to share a link 647 and an option to expire a link 648. A person of ordinary skill in the art would recognize a variety of techniques for receiving receive a user request, including via a touch-screen device, keyboard shortcuts, menu bars, drop-down lists, etc., and all such techniques are within the scope of the present invention. In this embodiment, a user may select the option to share a link 647, thereby indicating a desire to share third data object 632. However, in other embodiments, the user may select different data objects to share, such as first data object 622 and/or second data object 626. Further, a person of ordinary skill in the art would recognize that the request may be to share a data object with more than one recipient. Accordingly, a data object can be shared by a user of sender's computing device 110 regardless of whether the data object is stored on sender's computing device 110 or elsewhere.

Returning to FIG. 2, in operation 220, a determination is made as to whether information about characteristics of the recipient computing device (or devices) is available. For example, where a user of client computing device 110 submits a request to client computing device 110 to share a data object with a recipient associated with client computing device 120, processor 114 of client computing device 110 may determine whether information about characteristics of computing device 120 are available.

Characteristics of the recipient computing device may include any suitable characteristics concerning the computing environment or context in which the recipient computing device operates or is capable of operating in. This may include, for example, a hardware configuration of the computing device, a software configuration of the computing device, a location of the computing device, etc. The hardware configuration may include characteristics of one or more hardware components of the computing device. For example, the hardware configuration may include one or more of an amount of available storage space, an input capability (alphabetic, numeric, alphanumeric, symbolic, voice, touch-screen, language, etc.), an output capability (visual, audible, screen resolution, screen size, etc.), a processor capability (clock rate, integer range, instruction set architecture, parallel or non-parallel structure, instructions per clock, etc.), a networking capability (maximum bandwidth, communication protocol, wired/wireless, etc.), and a networking address (IP address, MAC address, etc.). The software configuration may include one or more of an application being installed (e.g., Microsoft Word™, AutoCAD™, etc.), an operating system being used (e.g., Microsoft Windows™, Unix™, Mac OS X™, etc.), a device driver, a kernel, a codec (audio such as Audio Interchange File Format or MPEG-4 Audio, video such as H264 or MPEG-4 Part 2), a file system (disk, flash, tape, FAT, NTFS, HFS Plus, etc.). The location of the computing device may be any suitable location, such as a GPS coordinate, a mailing address, a position triangulated using cellular telephone signals, etc. A person of ordinary skill in the art would recognize the existence of various other characteristics associated with computing device, and all such characteristics are intended to be within the scope of this disclosure.

The determination as to whether information about characteristics of the recipient computing device are available may be made using any one or more suitable techniques. In one embodiment, information about such characteristics may be received by a suitable entity, such as the recipient, the computing device associated with the recipient, a remote computing system (e.g., remote computing system 130), a user associated with a computing device 110, and/or a third party system (e.g., a cellular positioning entity). If such information is received and/or stored in, for example, storage element 116, it may determined that such information is available. Otherwise, it may be determined that such information is not available.

For example, client computing device 110 may send an information request to remote computing system 130 requesting information about characteristics of the recipient computing device, such as whether or not the recipient computing device is operable to execute a particular application. Remote computing system 130 may then scan existing connections to determine whether the recipient is currently executing the application, and/or may search a directory of registered users to determine whether the recipient is operable to execute the application. Based on the scan and/or search, remote computing system 130 may then respond to client computing device 110 with information indicating whether or not the recipient computing device is operable to execute the application. A person of ordinary skill in the art would recognize various other ways for making such a determination, all of which are intended to be within the scope of this disclosure.

In one embodiment, a user of client computing device 110 may identify a recipient and enter into client computing device 110 information about characteristics of the recipient's computing device. In another embodiment, a user of client computing device 110 may identify a recipient and client computing device 110 may subsequently acquire such information from a suitable source, such as remote computing system 130 or the recipient or recipient's computing device. In yet another embodiment, default rules may be programmed into client computing device 110, in which one or more characteristics of the recipient computing device are assumed without any input.

If it is determined that no information about characteristics of the recipient computing device is available, in operation 230, the user's computing device may generate an identifier that references the data object without using such information. As a result, the identifier may be a general identifier in that is not customized at all with respect to the recipient computing device.

By referencing the data object, the identifier may indicate a location as to where the data object is stored. For example, the data object may be stored in storage element 136 of remote computing system 130, and thus the identifier may indicate the location in storage element 136. For another example, the data object may be stored by a computing system (not shown) separate from remote computing system 130, in which case the identifier may reference the other computing system which may subsequently use the identifier to locate the data object. For yet another example, portions of the data object may be stored across multiple storage elements in remote computing system 130 and/or separate computing systems (not shown), in which case the identifier may be used by any or all of such systems to locate and assimilate the data object portions.

Further, the identifier may indicate a preferred consumption process. The preferred consumption process may be defined by any suitable entity, such as the sender, the sender's computing device, or the remote computing system. For example, the sender may indicate a consumption process wherein it is preferred that the data object is synchronized with the remote computing system. The preferred consumption process may additionally or alternatively be defined by any suitable object, such as the object being shared. For example, where the data object has a particular format, such as Microsoft Word™ format, the preferred consumption process may be to view or otherwise edit the data object using the native application, such as Microsoft Word™.

The identifier that references the data object may be generated using any one of a variety of techniques. In one embodiment, where the data objects are provided in an application context, the application may acquire the reference to the data object as a result of performing a synchronization. For example, with reference to FIG. 6A, in synchronizing first data object 622, application 610 may receive a reference to the first data object provided on remote computing system 130 as a result of synchronizing the data object. Similarly, in synchronizing the metadata for second data object 626, application 610 may receive a reference to the second data object provided on remote computing system 130 as a result of synchronizing the metadata. The identifier may then include such references therein. In another embodiment, where the data objects are not provided in an application context, the sending computing device may acquire the reference as a result of communicating the data object to the remote system. For example, with reference to FIG. 6A, in response to sharing third data object 632, a copy of third data object 632 may be provided to remote computing system 130, and a reference to the copy on remote computing system 130 generated by remote computing system 130 may also be generated and communicated to the sender computing device 110. The identifier may then include such a reference. A person of ordinary skill in the art would recognize various other ways for generating an identifier, all of which are intended to be within the scope of this disclosure.

Returning to FIG. 2, if, on the other hand, it is determined that information about characteristics of the recipient computing device are available, in operation 240, the user's computing device may generate an identifier based on such information. As a result, the identifier may be customized for the recipient computing device, thereby increasing the likelihood that the recipient computing device may consume the data object in accordance with a preferred consumption process.

In one embodiment, the identifier may be generated based on a hardware and/or software configuration of the recipient computing device. For example, sender computing device 110 (associated with a user desiring to share a data object) may acquire information indicating that recipient computing device 120 (associated with a recipient of the shared data object) is configured to execute a particular software application, such as application 610 (FIG. 6A). If the recipient is associated with a computing device that is configured to execute the software application, the identifier may reference the data object and provide instructions to the recipient's computing device 120 and/or remote computing system 130 to synchronize the recipient's computing device 120 with the data object stored on the remote computing system 130 via the software application provided on the recipient's computing device 120. In contrast, if information concerning client computing device 120 indicates that client computing device 120 is not configured to execute the particular software application, the identifier may reference the data object and provide alternative instructions to the recipient's computing device 120 and/or remote computing system 130. For example, the instructions may instruct remote computing system 130 to make a copy of the data object available for download by recipient's computing device 120.

For another example, client computing device 110 may acquire information indicating that client computing device 120 is operable to playback media encoded in certain format (e.g., MPEG-4) and at a certain maximum resolution (e.g., 1024 by 768 pixels). The identifier may reference the data object and provide instructions to the recipient's computing device 120 and/or remote computing system 130 to facilitate the consumption of the data object or a modified version of the data object. For example, where the data object is media encoded in the certain format and at the maximum resolution or a resolution lower than the maximum (e.g., encoded using MPEG-4 at 1024 by 768 pixels), the instructions may be to provide the data object as communicated by client computing device 110 for consumption. However, where the data object is not formatted such that it may be consumed by recipient's computing device 120 (e.g., H.264 at 1280 by 1024 pixels), then the instructions may instruct remote computing system 130 and/or recipient's computing device 120 to convert the data object into a format (e.g., MPEG-4 at 1024 by 768 pixels) such that recipient's computing device 120 may consume the data object.

Returning once again to FIG. 2, once the identifier that references the data object has been generated, regardless of whether the identifier is based on one or more characteristics of the recipient computing device, in operation 260 the identifier may be communicated to one or more recipients. The identifier may be communicated to the recipient(s) using any one or more of a variety of techniques. For example, upon selecting a data object to share, a user may input an email address of a recipient, and the identifier may be communicated to that email address. For another example, the user may input an account associated with a social networking service, such as an account on Facebook™, Twitter™, or Blogger™, and the identifier may be communicated for display to the public or a subset of the public via the social networking service.

Figure 6C:
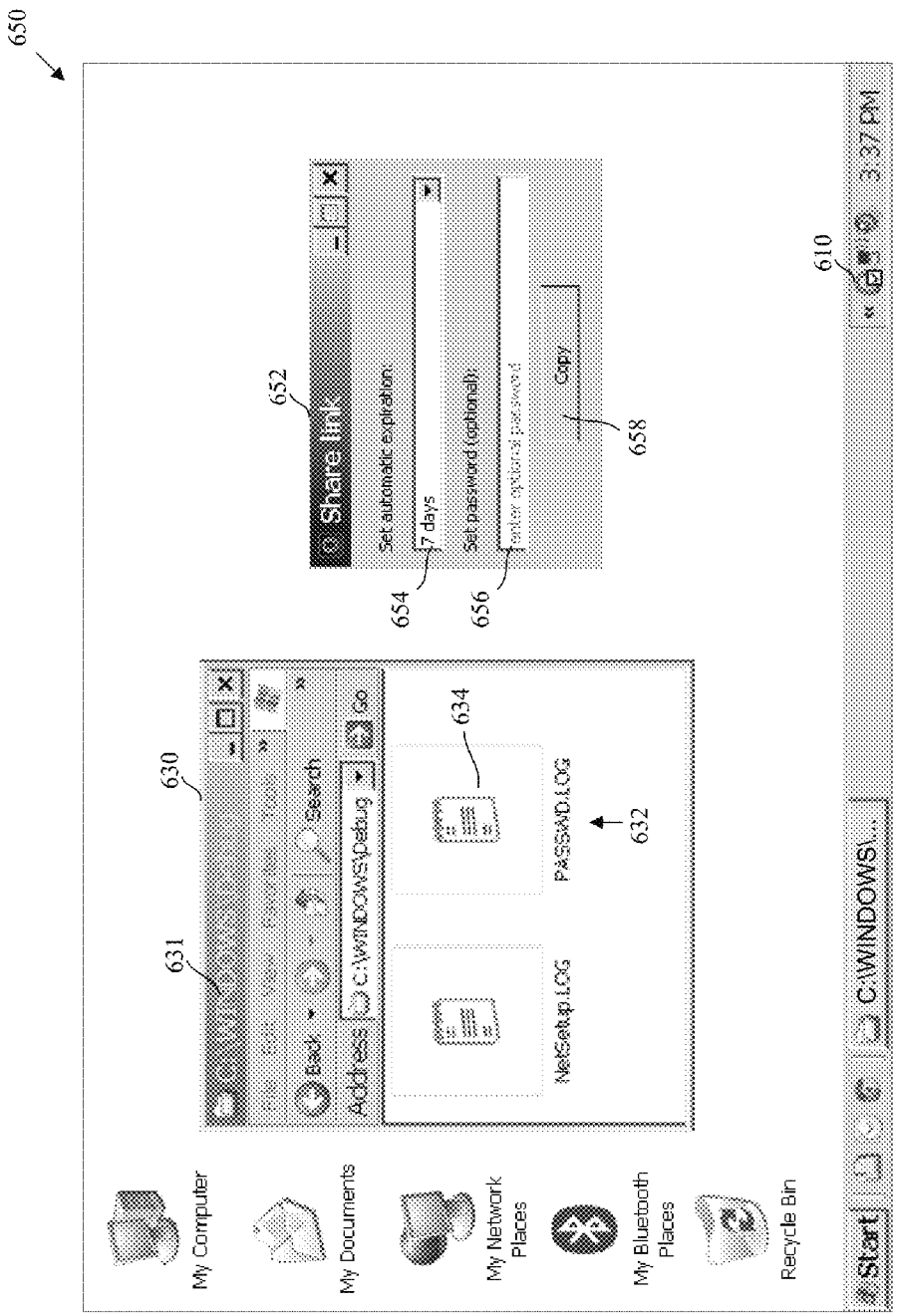
FIG. 6C shows a simplified graphical user interface of a sender's client computing device in which an identifier that references a selected data object is generated.
Figure 6D:
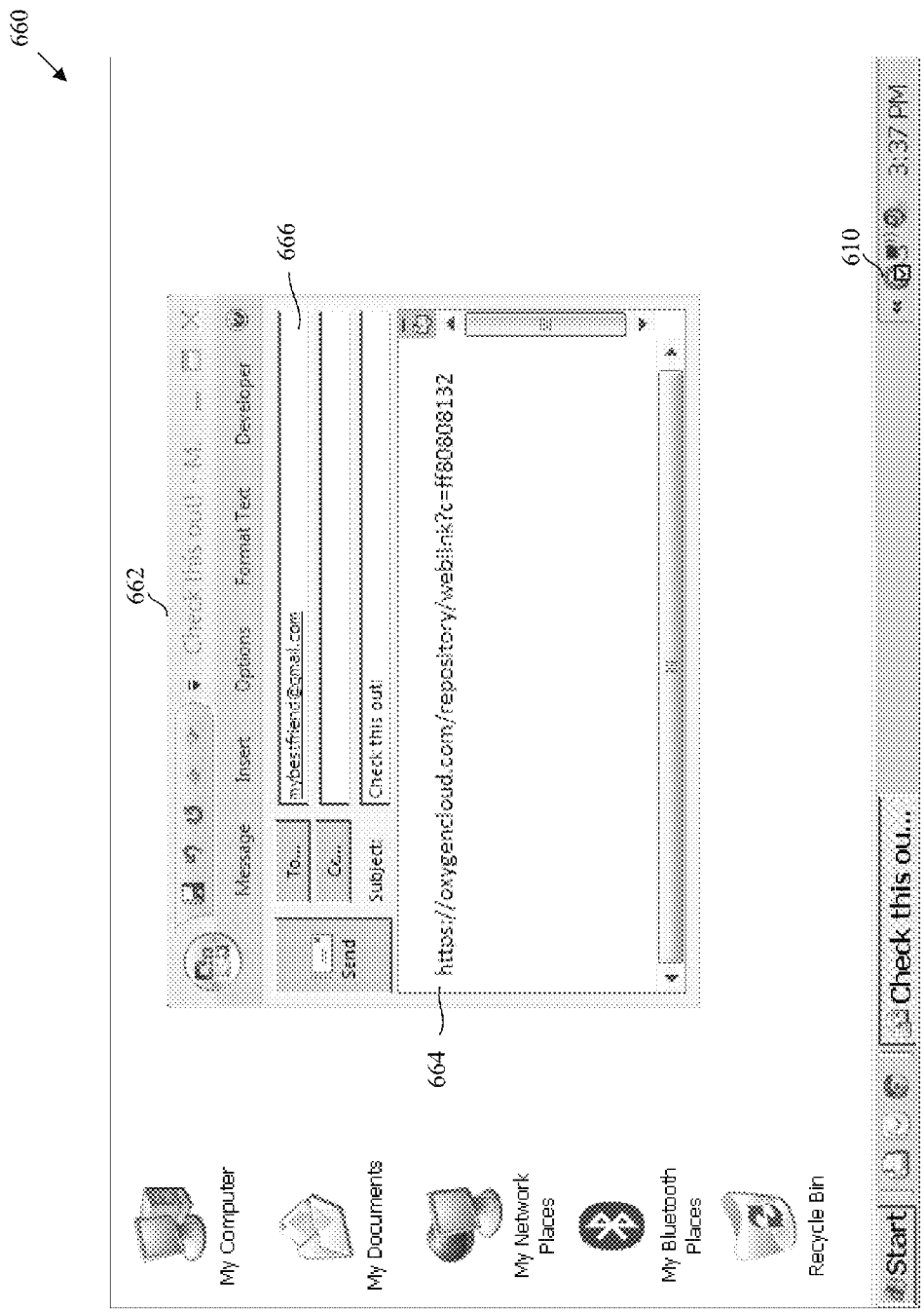
FIG. 6D shows a simplified graphical user interface of a sender's client computing device in which the identifier is communicated to a recipient.

Turning briefly to FIGS. 6C and 6D, FIG. 6C shows a simplified GUI 650 of a sender's computing device 110 in which an identifier that references a selected data object is generated while FIG. 6D shows a simplified GUI 660 of a sender's computing device 110 in which the identifier is communicated to a recipient. With reference to FIG. 6C, in response to receiving a user request to share third data object 632, a dialog box 652 is displayed. Dialog box 652 may include a link expiration time 654 defining a time in which the identifier is valid, and a password input 656 allowing the user of client computing device 110 to set a password for encrypting the shared data object. Dialog box 652 may also include a copy button 658, selection of which causes the identifier that references the data object to be copied to a clipboard of the operating system. Once the identifier has been copied to the clipboard of the operating system, the identifier may be pasted into any suitable application. For example, as shown in FIG. 6D, identifier 664 may be pasted into an email application 662 and subsequently emailed to recipient 666. A person of ordinary skill in the art would recognize various other ways for communicating an identifier to one or more recipients, all of which are intended to be within the scope of this disclosure.

It should be appreciated that all of the operations shown in FIG. 2 and discussed with reference thereto are not necessary, and some embodiments include sequences of operations in which one or more of the operations are omitted. For example, in one embodiment, operations 220 and 240 may be omitted. In this case, a sender may indicate a request to share a data object, and an identifier is generated without any concern for information about characteristics of a recipient computing device. In such an embodiment, a device other than the sender computing device may then facilitate consumption of the data object by the recipient computing device. For example, the recipient computing device may perform various operations for consuming the data object in accordance with one or more consumption processes, such as is discussed with reference to FIG. 4. For another example, the remote computing system may intervene and perform operations to facilitating consumption of the data object by the recipient computing device such as is discussed in operation 570 with reference to FIG. 5. In cases where the sender computing device generates an identifier without any concern for information about characteristics of the recipient computing device, processing performed by the sender computing device and/or requirements that the sender be knowledgeable about the recipient may advantageously be reduced. In contrast, in embodiments where an identifier is generated using characteristics of a recipient computing device, while the processing and knowledge requirements are increased for the sender computing device and sender, respectively, processing requirements of the recipient computing device may advantageously be reduced.

It should also be appreciated that the specific operations illustrated in FIG. 2 provide a particular method that may be executed by a client computing device, according to certain embodiments of the present invention. Other sequences of operations may also be performed according to alternative embodiments. For example, alternative embodiments of the present invention may perform the operations outlined above in a different order. Moreover, the individual operations illustrated in FIG. 2 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 3:
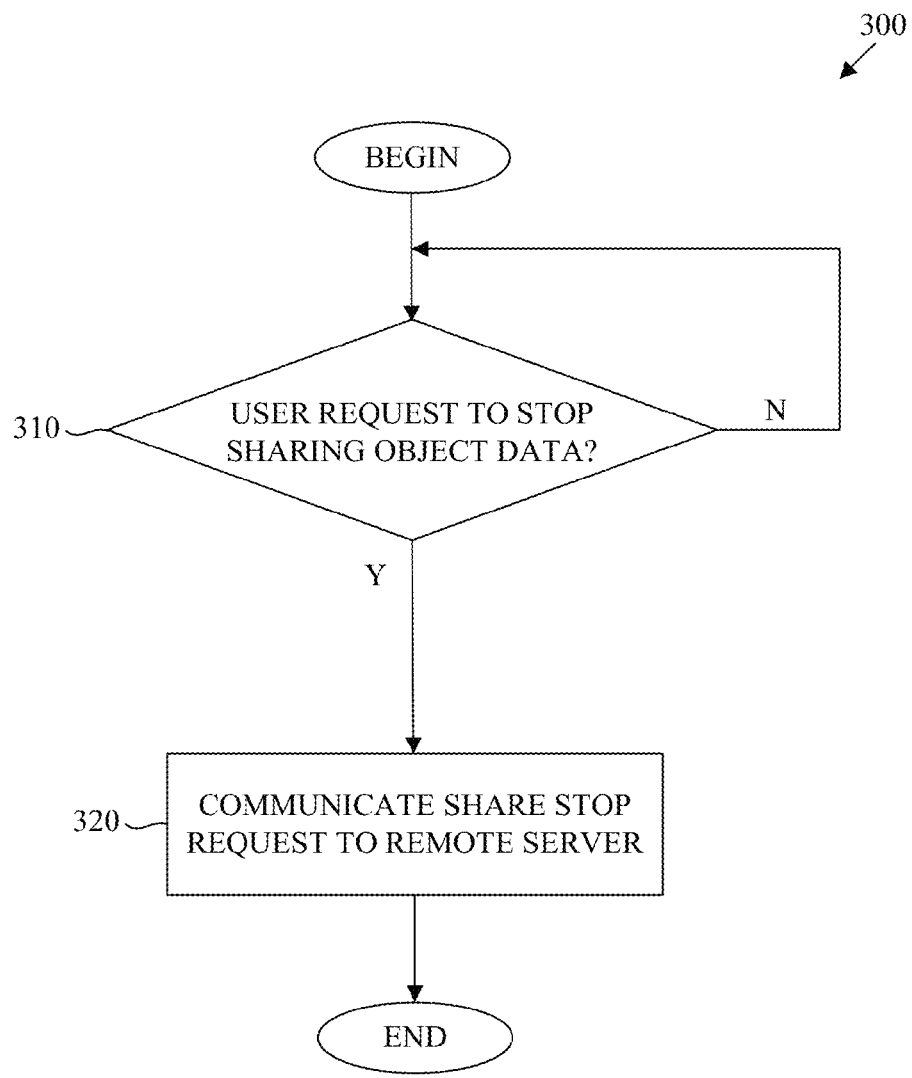
FIG. 3 is a flowchart depicting example operations for invalidating an identifier that references a data object.

FIG. 3 is a flowchart depicting example operations 300 for invalidating an identifier that references a data object. As a result of invalidating the identifier, the reference to the data object may become inoperable. Invalidating an identifier may be particularly advantageous when, after an identifier to a data object has been communicated from a sender to a recipient, the sender may subsequently desire to prevent the recipient from accessing the data object.

In operation 310, a determination is made as to whether a user has communicated a request to stop sharing a data object. For example, client computing device 110 may receive a request from a user of computing device 110 to stop sharing a data object. The request may be to stop sharing the data object based on the passage of time. For example, the user may request that sharing be immediately terminated, be terminated after a given time period (e.g., after a certain number of days or weeks has passed), or terminated on a particular date and/or particular time. For another example, the user request that sharing be terminated based on some condition other than time, such as whether the recipient has accessed the data object, whether a certain number of recipients have accessed the data object, etc. Further, client computing device 110 may generate any suitable graphical interface for receiving such input. For example, with reference to FIG. 6C, dialog box 652 including link expiration time 654 may be provided in which the user may select an amount of time for which the identifier is valid.

If it is determined that a user has not requested to stop sharing the data object, client computing device 110 may continue to monitor for such a user input. If, on the other hand, a request to stop sharing the data object has been received, processing may continue with operation 320 in which a share stop request is communicated to the remote server. The share stop request may be communicated to the remote server at any suitable time and indicate a request to invalidate the identifier at any suitable time as long as the condition(s) provided in the user request are satisfied. For example, where the user has requested that the data object is not to be shared after, e.g., 7 days, client computing device 110 may immediately communicate the request to remote server with an instruction to not stop sharing until 7 days later, or the client computing device 110 may wait until 7 days later and then communicate an instruction to immediately stop sharing the data object. Remote computing system 130 may then invalidate the reference provided in the identifier at the time or under the condition specified in the instruction.

It should be appreciated that the specific operations illustrated in FIG. 3 provide a particular method that may be executed by a client computing device, according to certain embodiments of the present invention. Other sequences of operations may also be performed according to alternative embodiments. For example, alternative embodiments of the present invention may perform the operations outlined above in a different order. Moreover, the individual operations illustrated in FIG. 3 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 4:
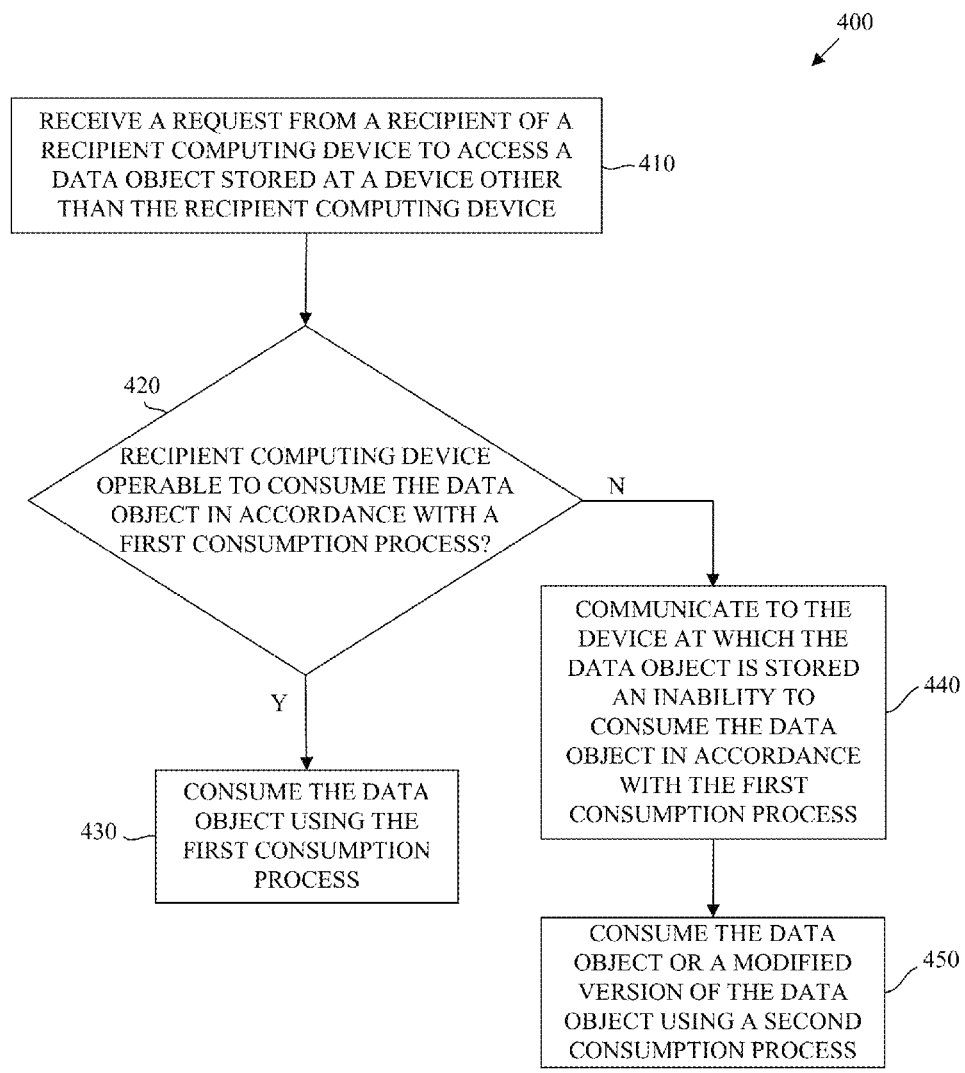
FIG. 4 is a flowchart depicting example operations of a recipient client computing device in accordance with an embodiment.

FIG. 4 is a flowchart depicting example operations 400 of a recipient computing device 120 in accordance with an embodiment. The example operations show one or more steps that may be used by an individual receiving an identifier that references a data object provided on a remote computing system. In some embodiments, the received identifier may be a general identifier that references the data object, such as an identifier created in accordance with operation 230 (FIG. 2), or an identifier that was created without consideration for whether or not information about characteristics of the recipient computing device were available at the sender computing device. In other embodiments, the identifier may be a customized identifier, where the identifier is customized based on one or more characteristics of the recipient computing device. For example, the identifier may be customized in accordance with operation 240 (FIG. 2). The following operations discussed with reference to FIG. 4 are discussed in the context of the recipient receiving and executing a general identifier (i.e., one that is not customized to the recipient computing device). In such cases, the processing requirements of the user computing device that generates the identifier (e.g., client computing device 110) may be reduced, and the identifier may generally be easier to generate. The subsequent processing for consuming the data object may consequently be performed by the recipient computing device, and include one or more of the operations discussed herein. However, in some embodiments, the following operations may also or alternatively be performed in response to receiving a customized identifier. For example, the customized identifier may be generated using incorrect or incomplete information about the characteristics of the recipient computing device, in which case the recipient computing device may not actually be able to consume the data object as expected by the user sharing the data object.

In operation 410, a request from a recipient of a recipient computing device to access a data object stored at a device other than the recipient computing device is received. For example, recipient computing device 120 may receive a request from a user of recipient computing device 120 via a user interface (not shown) of recipient computing device 120 to access a data object stored at remote computing system 130 and/or sender computing device 110. The request may be received as a result of the recipient executing, via recipient computing device 120, an identifier received from a sender. The identifier may be any suitable identifier as previously discussed, such as identifier 664 (FIG. 6D). The identifier may reference any suitable data object stored at a device other than recipient computing device 120, such as remote computing system 130 or separate computing systems (not shown) operable with remote computing system 130 to store the data object. For example, the data object may be third data object 632 stored in storage element 136 and for which an identifier has been communicated to the recipient by the remote computing system or generated by the sender computing device 110.

In operation 420, a determination is made as to whether the recipient computing device is operable to consume the data object in accordance with a first consumption process. For example, client computing device 120 may determine whether it is operable to consume data object 632 in accordance with a desired consumption process. The desired consumption process may be any suitable process for consuming a data object. In one embodiment, the desired consumption process may be indicated by the general identifier. For example, the desired consumption process may be a synchronization process whereby the data object is synchronized with the recipient computing device. In another embodiment, the desired consumption process may be indicated by characteristics of the data object. For example, the data object may be a Microsoft Word™ document, in which case the desired consumption process may be for the recipient computing device to execute an application (such as a suitable version of Microsoft Word™) operable to view, edit, or otherwise consume the data object. In yet another embodiments, the desired consumption process may be indicated by both the general identifier and the characteristics of the data object. Regardless of how the desired consumption process is indicated, it should be recognized that the desired consumption process may be any one or more of a variety of techniques for consuming a data object. In addition to those mentioned above, the desired consumption process may include streaming the data object, augmenting the content of the data object, etc. One of ordinary skill in the art would recognize a variety of techniques for consuming a data object, and all such techniques are intended to be within the scope of this disclosure.

Whether the recipient computing device is operable to consume the data object in accordance with a first consumption process may depend on characteristics of the recipient computing device, such as the hardware configuration of the recipient computing device, software configuration of the recipient computing device, location of the recipient computing device, etc. Any one or more of a variety of techniques may be used to determine the characteristics of the recipient computing device, and thus determine whether the recipient computing device is operable to consume the data object in accordance with the first consumption process. For example, with respect to the software configuration of the recipient computing device, the received identifier may identify an application which, if executed by the recipient computing device, is operable to synchronize the recipient computing device with the data object. The recipient computing device may then determine whether it is capable of executing the application. For example, the computing device may scan a list of currently running processes to determine whether any one or more of the processes matches a process associated with the application. If there is a match, the computing device may determine that it is capable of executing the application. For another example, the recipient computing device may scan an application registry that registers a list of applications that are installed on the computing device to determine whether any one or more of the listed applications matches the application. If there is a match, the computing device may determine that it is capable of executing the application. A person of ordinary skill in the art would recognize various other ways for determining whether the recipient computing device is capable of executing an application identified by a received identifier that references a data object, all of which are intended to be within the scope of this disclosure.

Figure 7A:
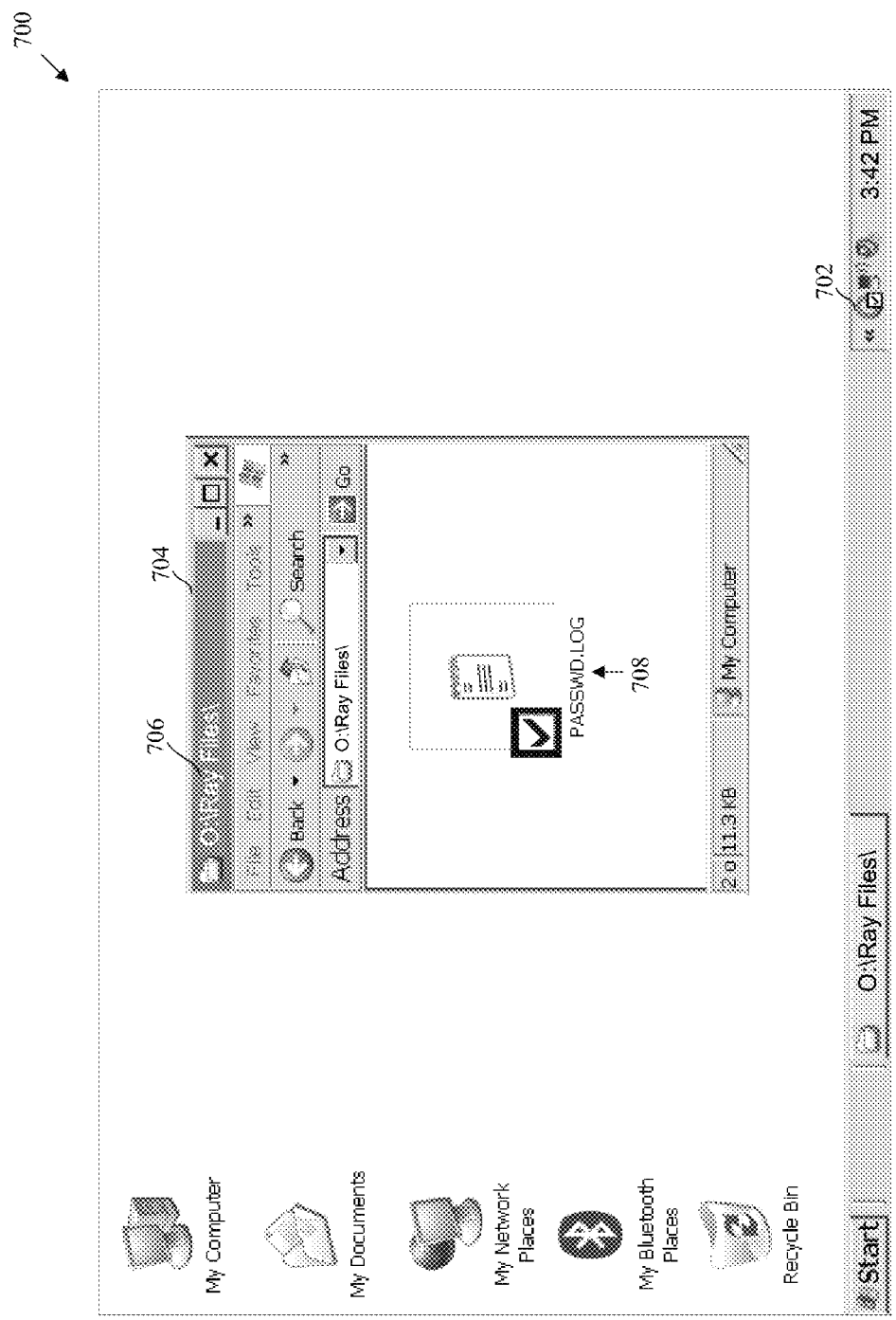
FIG. 7A shows a simplified graphical user interface of a recipient's client computing device in which a particular application is executing.

If it is determined that recipient computing device is operable to consume the data object in accordance with the first consumption process, then processing may continue to operation 430 in which the data object is consumed using the first consumption process. In one embodiment, if the recipient computing device determines that it is operable to execute an application identified by a received identifier that also references a shared data object, then recipient computing device may execute the application to consume the data object. For example, if recipient computing device 120 determines that it is operable to execute application 610 (FIG. 6A), then recipient computing device 120 may execute the application and synchronize with the data object stored at remote computing system 130. Turning briefly to FIG. 7A, FIG. 7A shows a simplified GUI 700 of a recipient's computing device 120 in which an application 702 (which may or may not be similar to application 610) is executing. A network folder 704 is provided, similar to network folder 620, but here referred to as "O:\Ray Files\" 706. In this case, identifier 664 (FIG. 6D) references the copy of third data object 632 stored at remote computing system 130. In response to the user of recipient computing device 120 engaging the identifier, a copy 708 of third data object 632 is acquired by recipient computing device 120 and synchronized with the copy of third data object 632 stored at remote computing system 130. In this fashion, changes made to copy 708 of third data object 632 are communicated to sender computing device 110 via remote computing system 130 such that third data object 632 stored in sender computing device 110 is changed to reflect changes to copy 708. Similarly, changes made to third data object 632 are reflected in copy 708. The same can be said for changes in metadata associated with third data object 632.

For another example, if the data object is in a particular format (such as Microsoft Word™), a received identifier may indicate that format. If recipient computing device 120 determines that it is operable to execute an application sufficient to view, edit, or otherwise consume the particular format (e.g., the Microsoft Word™ application), then recipient computing device 120 may execute the application, receive a copy of the data object, and consume the data object using the application.

If, on the other hand, it is determined that recipient computing device 120 is not operable to consume the data object in accordance with the first consumption process, then processing may continue to operation 440 in which the recipient computing device communicates, to the device at which the data object is stored, an inability to consume the data object in accordance with the first consumption process. For example, if recipient computing device 120 is not operable to execute application 702 (FIG. 7A) so as to synchronize with the data object stored on remote computing system 130, recipient computing device 120 may communicate, to remote computing system 130, information indicating that it is not operable to consume the data object in accordance with a first consumption process.

The recipient computing device may communicate its inability to consume the data object in accordance with the first consumption process using one or more of a variety of techniques. For example, the recipient computing device may explicitly communicate, to the device at which the data object is stored, information indicating its inability to consume the data object. For another example, the recipient computing device may return, to the device at which the data object is stored, information communicated from the device.

For yet another example, the recipient computing device may refuse to communicate information to the device at which the data object is stored for a certain length of time, the lack of information received at the device indicating the recipient computing device's inability to consume the data object. Other techniques for communicating an inability to consume a data object may be readily apparent to those of ordinary skill in the art, and all such techniques are intended to be within the scope of this disclosure.

In response to receiving information indicating that the recipient computing device is inoperable to consume a data object in accordance with a first consumption process, the device at which the data object is stored may provide the data object or a modified version of the data object to the recipient computing device for consumption in accordance with a second consumption process. The recipient computing device may then, in operation 450, consume the data object in accordance with the second consumption process.

For example, if recipient computing device 120 determines that it is not operable to execute application 610 (FIG. 6A) for synchronizing with the data object, recipient computing device 120 may instead acquire a copy of the data object for consumption. Recipient computing device 120 may receive the copy of the data object in one or more of a variety of fashions. For example, recipient computing device 120 may access a web page providing an interface to download the data object from remote computing system 130. For another example, recipient computing device 120 may receive the data object via an FTP session, email, peer-to-peer communication network, etc.

Figure 7B:
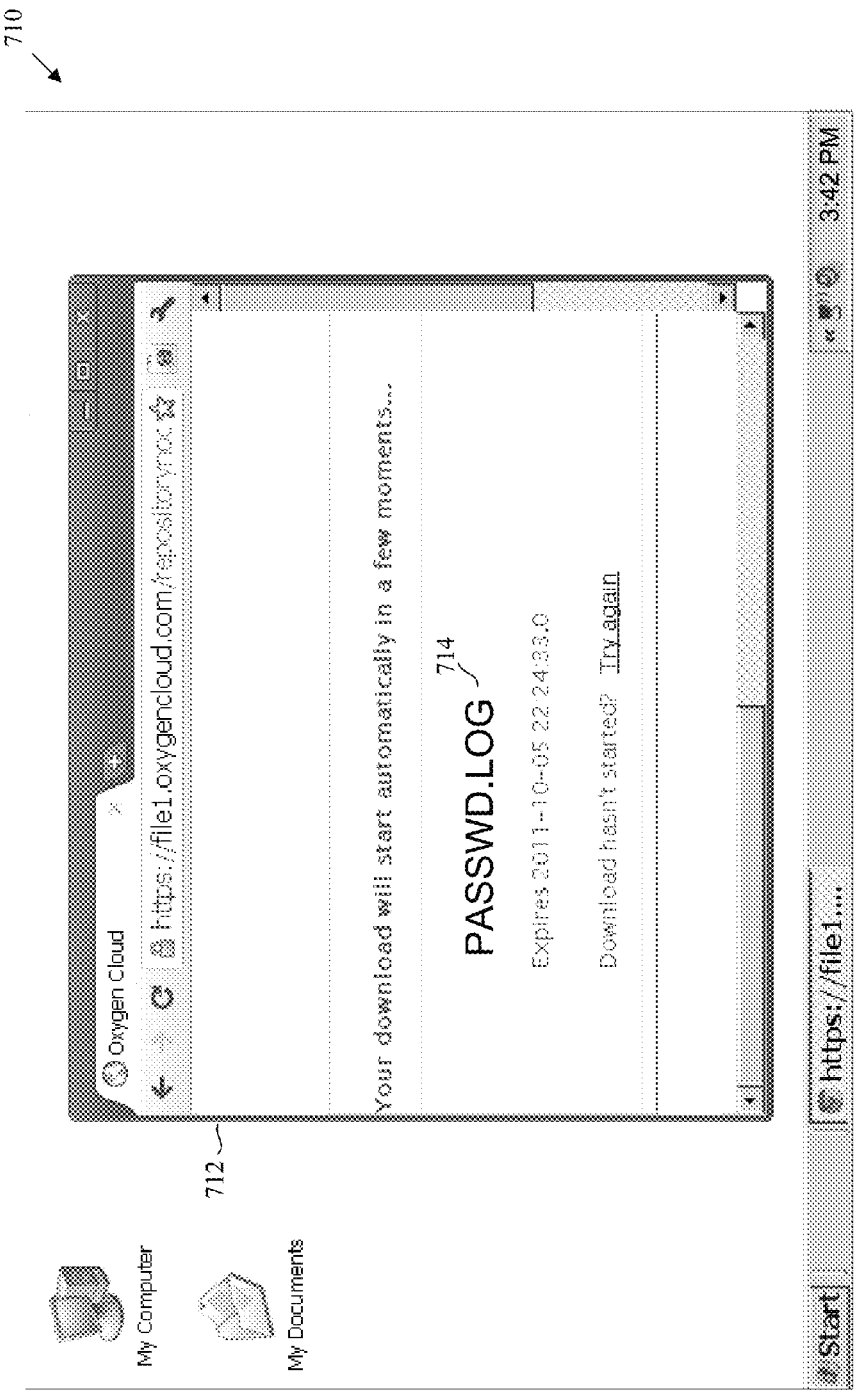
FIG. 7B shows a simplified graphical user interface of a recipient's client computing device in which a particular application is not executing and the device is accessing a webpage to download the data object.
Figure 7C:
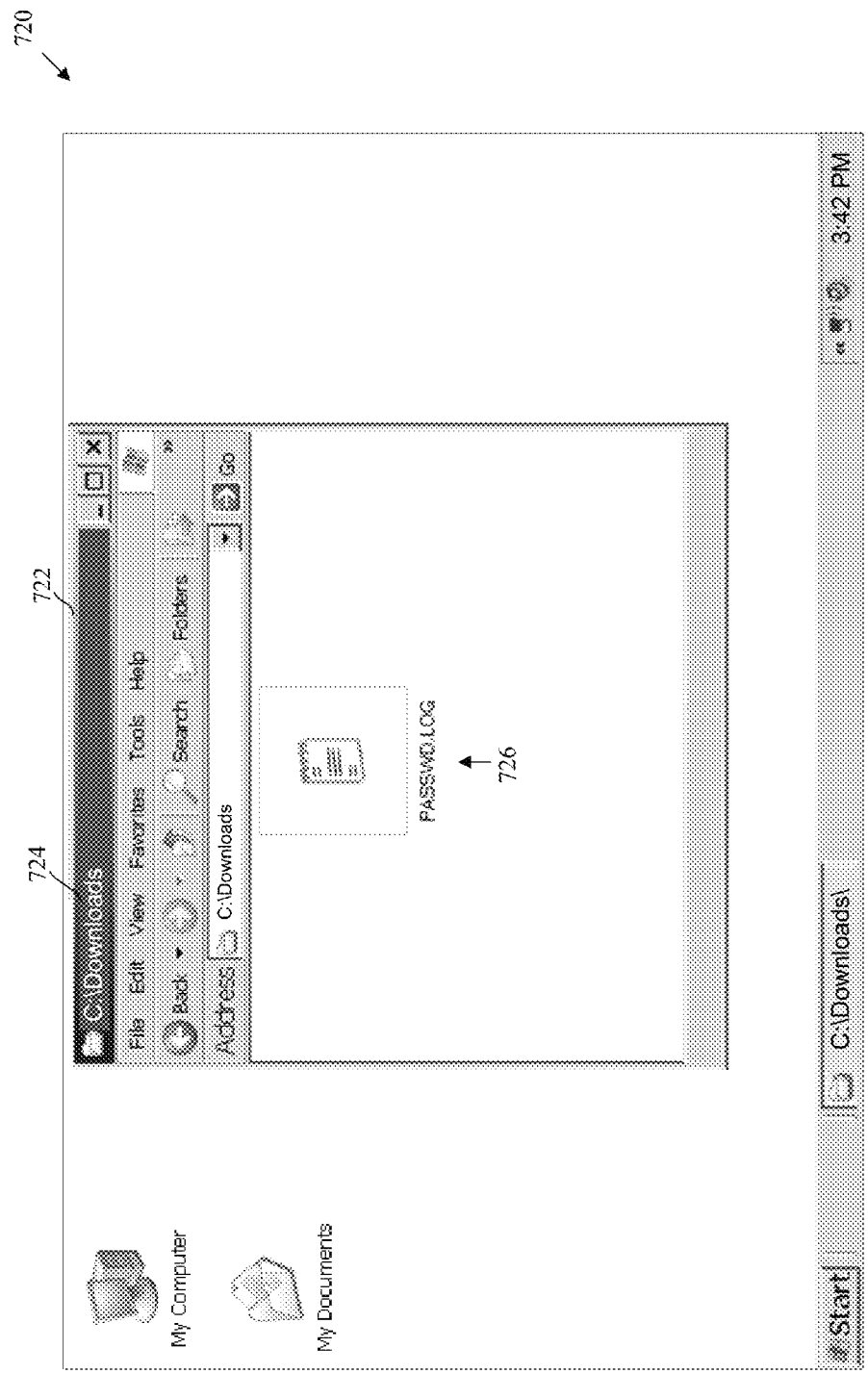
FIG. 7C shows a simplified graphical user interface of a recipient's client computing device in which a particular application is not executing and the device downloaded a copy of the data object.

Turning briefly to FIG. 7B, FIG. 7B shows a simplified GUI 710 of a recipient's computing device 120 in which an application for synchronizing the data object is not executing and the device is instead accessing a webpage to download the data object. For example, the recipient's computing device 120 may be inoperable to execute the application for synchronizing the data object, and in response to communicating its inability to consume the data object to remote computing system 130, remote computing system 130 may provide a link to a webpage via which the recipient may download a copy of the data object. For example, the recipient may execute a web browser application 712, a name 714 of third data object 632 may be presented, and a copy of third data object 632 may be downloaded by recipient computing device 120. As a result of downloading third data object 632, a copy of third data object 632 may be provided on the local storage of recipient computing device 120. For example, turning to FIG. 7C, FIG. 7C shows a simplified GUI 720 of a recipient's computing device 120 in which the application for synchronizing the data object is not executing and the device instead downloaded a copy of the data object. Here, recipient computing device 120 includes a local folder 722 similar to local folder 630 (FIG. 6A), but in this case referred to as "C:\Downloads" 724. In this case, the recipient has downloaded a copy 726 of third data object 632, which is subsequently stored in local folder 722 for viewing or editing by the user of client computing device 120, whereby such viewing and editing does not alter characteristics of the copy of third data object 632 stored at remote computing system 130. A person of ordinary skill in the art would recognize various other ways for communicating a copy of a data object, all of which are intended to be within the scope of this disclosure.

For another example, the data object referenced by an identifier may be a video file encoded using a particular encoder, such as MPEG-4. The recipient computing device may determine that it is inoperable to consume video files encoded using the MPEG-4 encoder. In response to receiving information indicating an inability to consume MPEG-4 encoded files, the device at which the data object is stored (e.g., the remote computing system) may convert the video file into a different format, such as H.264. The device at which the data object is stored may subsequently provide the modified data object (i.e., the video file encoded using H.264) for consumption by the recipient computing device.

It should be appreciated that the specific operations illustrated in FIG. 4 provide a particular method that may be executed by a client computing device, according to certain embodiments of the present invention. Other sequences of operations may also be performed according to alternative embodiments. For example, alternative embodiments of the present invention may perform the operations outlined above in a different order. Moreover, the individual operations illustrated in FIG. 4 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 5:
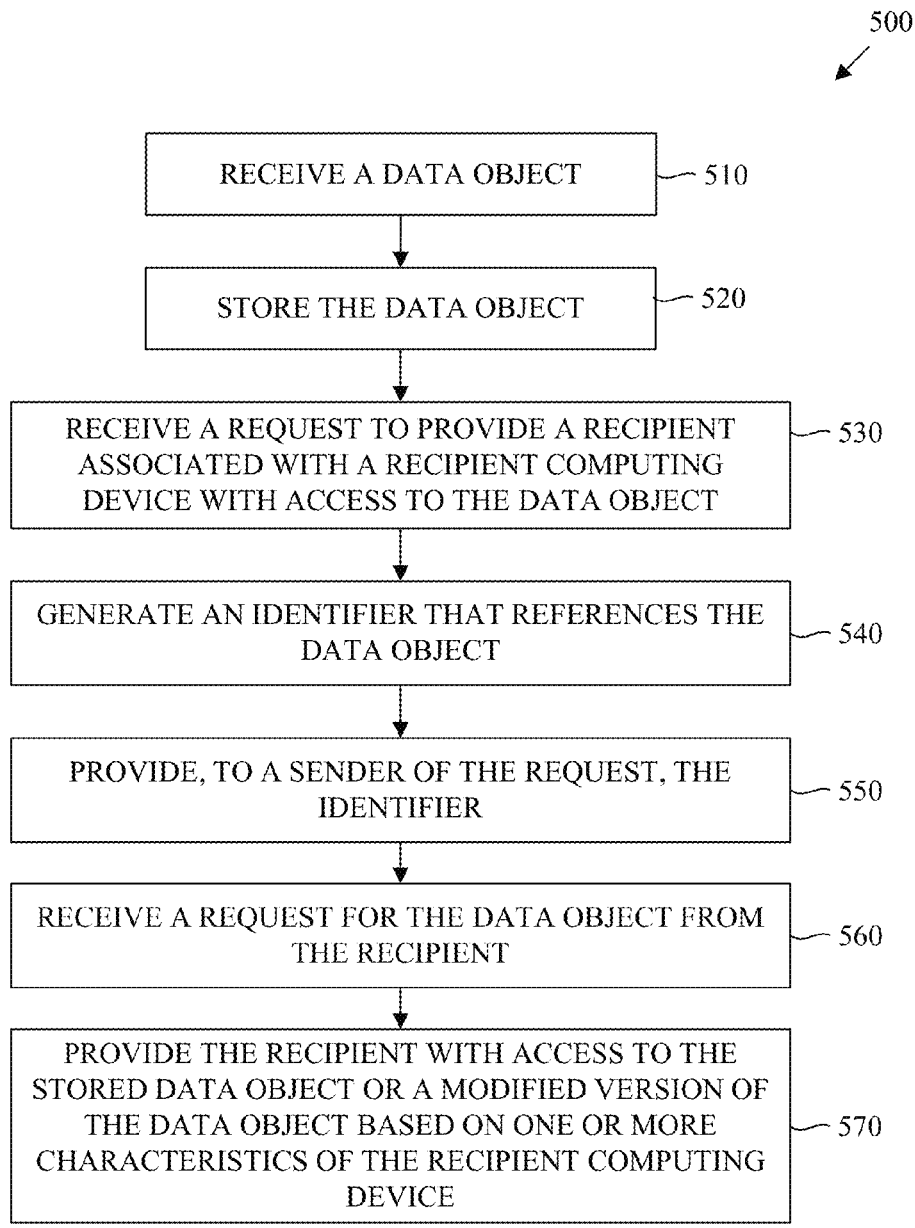
FIG. 5 is a flowchart depicting example operations of a remote computing system in accordance with an embodiment.

FIG. 5 is a flowchart depicting example operations 500 of a remote computing system 130 in accordance with an embodiment. The example operations show one or more steps that may be used to facilitate the sharing of content between devices.

In operation 510, a data object is received. For example, remote computing system 130 may receive a data object via communication interface 132. The data object may be received using any one or more of a variety of techniques. For example, with reference to FIG. 6A, client computing device 110 may communicate first data object 622 and/or second data object 626 during an initial synchronization, and/or may communicate third data object 632 in response to receiving a user request to share third data object 632.

In operation 520, the received data object is stored. For example, remote computing system 130 may store the received data object in storage element 130. Additionally or alternatively, remote computing system 130 may communicate the received data object for storage in a computing system (not shown) separate from remote computing system 130, may store only a portion of the data object with other portions stored elsewhere, and/or may communicate the received data object for storage in a number of separate computing systems.

In operation 530, a request to provide a recipient with access to the stored data object is received. For example, remote computing system 130 may receive a request from client computing device 110 via network 140 and communication interface 132 to share third data object 632 with recipient computing device 120.

In operation 540, an identifier that references the data object is generated. For example, remote computing system 130 may generate an identifier that references third data object 632 stored in storage element 136. Similar to operations 230 and 240 discussed with reference to FIG. 2, the identifier may be a general identifier or a customized identifier that is generated based on one or more characteristics of recipient computing device 120. Further, as discussed with reference to operation 240, the identifier may be generated based on a hardware and/or software configuration of the recipient computing device, and information about the recipient computing device may be acquired using one or more of a variety of techniques such as by receiving such information from the recipient, the computing device associated with the recipient, a user associated with a computing device 110, and/or a third party system.

In operation 550, remote computing system 130 may then provide the identifier to the sender of the request. For example, remote computing system 130 may provide the identifier that references third data object 632 to client computing device 110.

It should be recognized that in some embodiments, remote computing system 130 may neither generate nor provide to the sender an identifier that references the data object. For example, as previously discussed, the identifier may be generated by the sender of a data object to be shared. In some cases, although the remote computing system does not provide an identifier, it may provide a reference to a data object stored by the remote computing system.

In operation 560, a request for the data object is received from the recipient. For example, a request for third data object 632 stored at remote computing system 130 may be received from recipient computing device 120 via network 410 and communication interface 132. The request for the data object may be communicated to remote computing system 130 in any suitable fashion. For example, the request may be communicated as a result of recipient computing device 120 executing a received identifier.

In operation 570, the recipient is provided with access to the stored data object or a modified version of the data object based on one or more characteristics of the recipient computing device. For example, recipient computing device 120 may be provided access to stored third data object 632. Access to the data object may be provided using one or more of a variety of techniques.

In one embodiment, the identifier may be a general identifier. For example, an identifier generated in accordance with operation 230 (FIG. 2) or operation 540, whereby the identifier references the data object but is not generated based on characteristics of the recipient computing device. In such a case, remote computing system 130 may acquire information about characteristics of the recipient computing device before or while providing the recipient with access to the stored data. In one embodiment, in response to the recipient executing the identifier, the recipient may provide information to the remote computing system identifying characteristics of the remote computing device. For example, the recipient computing device may execute the identifier using a particular web browser, such as a particular version of Microsoft Internet Explorer™. The web browser, when executing the identifier, may simultaneously communicate information about the web browser and/or other information about the recipient computing device, such as whether the recipient computing device is capable of executing a particular software application. Upon receiving such information, the remote computing system may then provide the data object based on such information. For example, the remote computing system may convert the data object into a format consumable by the recipient computing device. For another example, the remote computing system may provide the data object for download rather than synchronization. For yet another example, the remote computing system may stream the data object to the recipient computing device. One of ordinary skill in the art would recognize a variety of techniques for consuming a data object, and all such techniques are intended to be within the scope of this disclosure.

In another embodiment, the identifier may be a customized identifier. For example, an identifier generated in accordance with operation 240 (FIG. 2) or operation 540, whereby the identifier references the data object and is generated based on characteristics of the recipient computing device. In such a case, remote computing system 130 may provide the recipient with access to the data object based on the characteristics of the recipient computing device recognized from the identifier. For example, where the identifier indicates that the recipient computing device is operable to consume a data object in a particular format, the remote computing system may provide the data object in that particular format by converting the data object as necessary, or requesting another device to convert the data (e.g., the sender computing device 110) and subsequently acquiring the converted data from the other device. For another example, where the identifier indicates that the recipient computing device is operable to synchronize with the data object, the remote computing system may synchronize the data object with the recipient computing device. For yet another example, the remote computing system may stream the data object to the recipient computing device. One of ordinary skill in the art would recognize a variety of techniques for consuming a data object, and all such techniques are intended to be within the scope of this disclosure.

It should be appreciated that the specific operations illustrated in FIG. 5 provide a particular method that may be executed by a client computing device, according to certain embodiments of the present invention. Other sequences of operations may also be performed according to alternative embodiments. For example, alternative embodiments of the present invention may perform the operations outlined above in a different order. Moreover, the individual operations illustrated in FIG. 5 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 8:
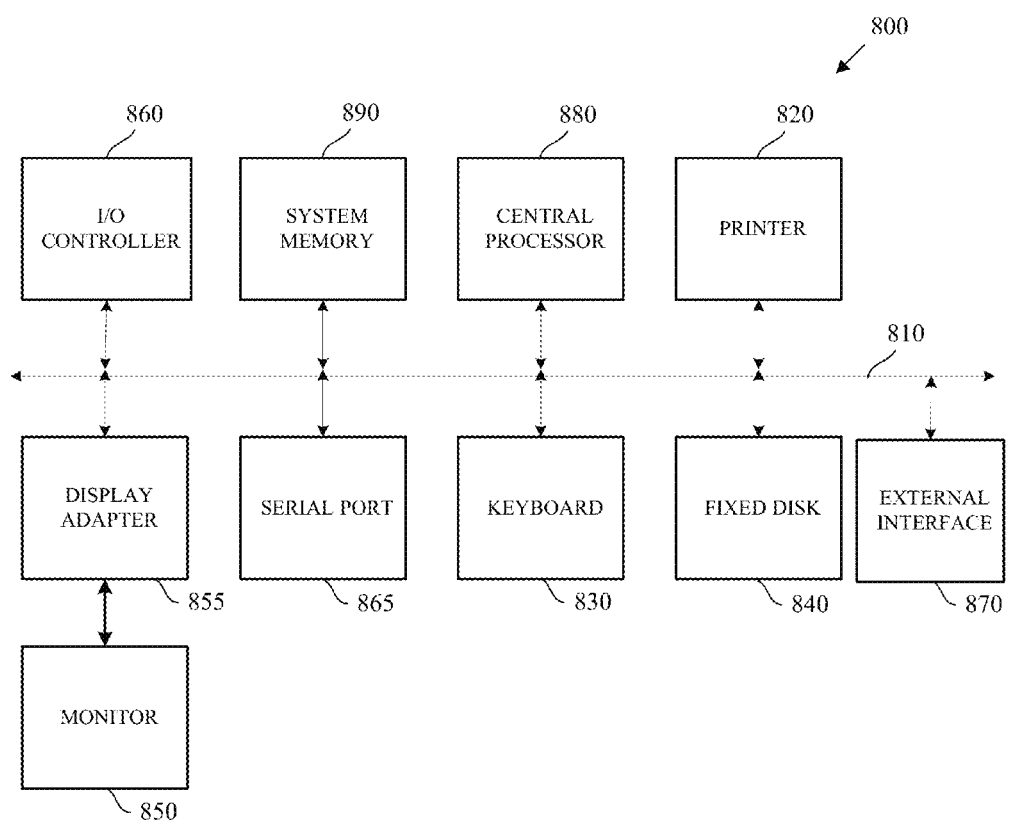
FIG. 8 is a diagram of a computer apparatus according to some embodiments.

FIG. 8 is a diagram of a computer apparatus 800 according to some embodiments. The various elements in the previously described system diagram (e.g., one or more client computing devices 110-120, and/or remote computing system 130) may use any suitable number of subsystems in the computer apparatus to facilitate the functions described herein. Examples of such subsystems or components are shown in FIG. 8. The subsystems shown in FIG. 8 are interconnected via a system bus 810. Additional subsystems such as a printer 820, keyboard 830, fixed disk 840 (or other memory comprising tangible, non-transitory computer-readable media), monitor 850, which is coupled to display adapter 855, and others are shown. Peripherals and input/output (I/O) devices (not shown), which couple to I/O controller 860, can be connected to the computer system by any number of means known in the art, such as serial port 865. For example, serial port 865 or external interface 870 can be used to connect the computer apparatus to a wide area network such as the Internet, a mouse input device, or a scanner. The interconnection via system bus allows the central processor 880 to communicate with each subsystem and to control the execution of instructions from system memory 890 or the fixed disk 840, as well as the exchange of information between subsystems. The system memory 890 and/or the fixed disk 840 may embody a tangible, non-transitory computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context. The scope of the invention should, therefore, be determined not with reference to the above description, but instead should be determined with reference to the pending claims along with their full scope or equivalents.

What is claimed is:

1. A method of operating a user computing device, the method comprising:

receiving, by the user computing device, a user request from a user of the user computing device to share a data object with a recipient associated with a recipient computing device;

determining whether or not information about one or more characteristics of a recipient computing device associated with the recipient is available;

generating a first identifier that references the data object using at least one of the one or more characteristics of the recipient computing device when the information about the one or more characteristics of the recipient device is available; and generating a second identifier that references the data object without using the one or more characteristics of the recipient computing device when the information about the one or more characteristics of the recipient device is not available, wherein the data object is consumed by the recipient computing device according to a first consumption process associated with the first identifier when the information about the one or more characteristics of the recipient computing device is available, and the data object is consumed by the recipient computing device according to a second consumption process associated with the second identifier when the information about the one or more characteristics of the recipient computing device is not available, wherein the first consumption process includes executing an application in which the data object was initially created, and wherein the second consumption process includes executing another application that is different than the application in which the data object was initially created, the other application operable to consume a modified version of the data object.

2. The method of claim 1, further comprising:
communicating the generated first or second identifier to the recipient user.

3. The method of claim 1, further comprising:
receiving one or more characteristics of the recipient computing device from one or more of the user, a remote server, and the recipient.

4. The method of claim 1, wherein the characteristics include one or more of a software configuration and a hardware configuration.

5. The method of claim 4, wherein the software configuration includes one or more of an application, an operating system, a device driver, a kernel, a codec, and a file system, and the hardware configuration includes one or more of an available storage space, input capability, output capability, processor capability, networking capability, and a network address.

6. The method of claim 1, further comprising:
receiving a request from the user of the user computing device to stop sharing of a data object with the recipient user; and in response to receiving the user request to stop sharing of the data object, communicating a share stop request to a remote computing system requesting the remote computing system to prevent access to the data object by the recipient.

7. A method of operating a recipient computing device, comprising:
receiving, by the recipient computing device, a request from a recipient associated with the recipient computing device to access a data object stored at a device other than the recipient computing device;

determining whether the recipient computing device is operable to consume the data object in accordance with a first consumption process;

if it is determined that the recipient computing device is operable to consume the data object in accordance with the first consumption process, then consuming the data object in accordance with the first consumption process; and if it is determined that the recipient computing device is not operable to consume the data object in accordance with the first consumption process, then communicating, by the recipient computing device, to the device at which the data object is stored information indicating that the recipient computing device is inoperable to consume the data object in accordance with the first consumption process, and consuming the data object in accordance with a second consumption process different than the first consumption process, wherein the first consumption process includes executing an application in which the data object was initially created, and wherein the second consumption process includes executing another application that is different than the application in which the data object was initially created, the other application operable to consume a modified version of the data object.

8. The method of claim 7, wherein the first consumption process includes synchronizing the recipient computing device with the data object.

9. The method of claim 7, wherein the second consumption process includes receiving a copy of the data object.

10. The method of claim 7, wherein determining whether the recipient computing device is operable to consume the data object in accordance with the first consumption process includes one or more of determining whether the recipient computing device has a particular software configuration and a hardware configuration.

11. The method of claim 7, further comprising communicating information identifying one or more of a software configuration and a hardware configuration of the recipient computing device together with the information indicating that the recipient computing device is inoperable to consume the data object in accordance with the first consumption process.

12. A method of managing data objects at a remote computing system, comprising:
receiving, by the remote computing system, a request to provide a recipient associated with a recipient computing device with access to a data object;

providing a first identifier that references the data object based on one or more characteristics of the recipient computing device when information about the one or more characteristics of the recipient device is available;

providing a second identifier that references the data object without using the one or more characteristics of the recipient computing device when the information about the one or more characteristics of the recipient device is not available;

receiving a request for the data object from the recipient; and providing the recipient with access to the data object based on one or more characteristics of the recipient computing device, wherein the data object is consumed by the recipient computing device according to a first consumption process associated with the first identifier when the information about the one or more characteristics of the recipient computing device is available, and the data object is consumed by the recipient computing device according to a second consumption process associated with the second identifier when the information about the one or more characteristics of the recipient computing device is not available, wherein the first consumption process includes executing an application in which the data object was initially created, and wherein the second consumption process includes executing another application that is different than the application in which the data object was initially created, the other application operable to consume a modified version of the data object.

13. The method of claim 12, wherein the one or more characteristics include one or more of a software configuration and a hardware configuration.

14. The method of claim 12, further comprising:

receiving information indicating that the recipient computing device is inoperable to consume the data object in accordance with a first consumption process; and providing the data object to the recipient computing device for consumption by the recipient computing device in accordance with a second consumption process.

15. The method of claim 12, further comprising modifying the data object before providing the recipient with access to the data object, wherein providing the recipient with access to the data object includes providing the recipient with access to the modified data object.

* * * * *